UNITED STATES PATENT OFFICE.

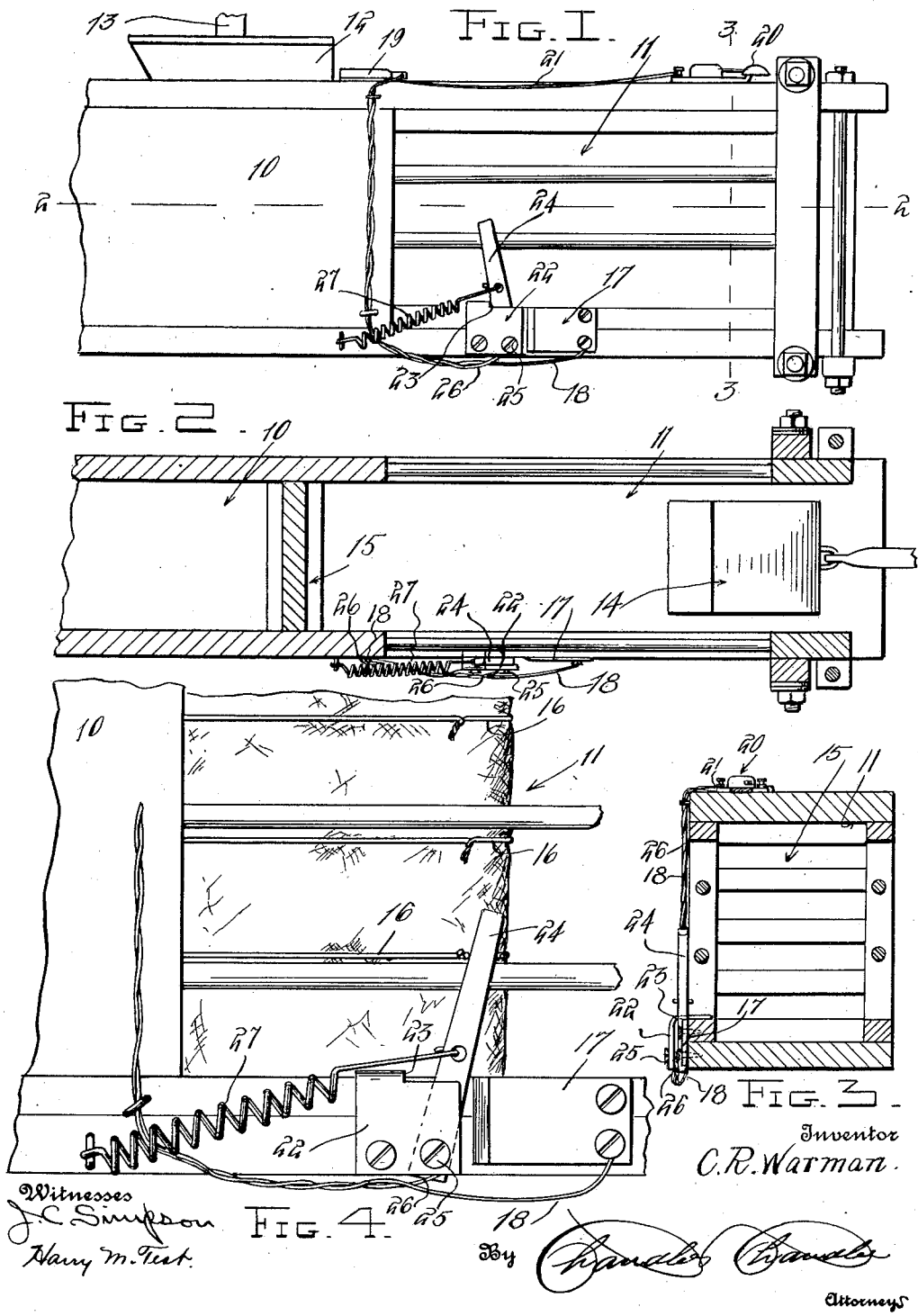

CHARLES R. WARMAN, OF NEWARK, OHIO.

BALING-PRESS ALARM.

1,098,602. Specification of Letters Patent. Patented June 2, 1914.

Application filed October 7, 1913. Serial No. 793,896.

*To all whom it may concern:*

Be it known that I, CHARLES R. WARMAN, a citizen of the United States, residing at Newark, in the county of Licking, State of Ohio, have invented certain new and useful Improvements in Baling-Press Alarms; and I do hereby declare the following to be a full, clear, and exact description of the invention, such as will enable others skilled in the art to which it appertains to make and use the same.

This invention relates to improvements in baling presses and particularly to signals or alarms therefor.

The principal object of the invention is to provide an alarm which will sound when the bale has been tied, and is being forced from the baling chamber.

Another object is to provide an alarm device which is simple in construction, efficient in operation, and which may be quickly and easily attached to any ordinary baling presses without modifications to the press.

Other objects and advantages will be apparent from the following description when taken in connection with the accompanying drawings.

In the drawings: Figure 1 is a side elevation of a baling press having my invention attached thereto. Fig. 2 is a horizontal longitudinal section on the line 2—2 of Fig. 1. Fig. 3 is a vertical transverse sectional view on the line 3—3 of Fig. 1. Fig. 4 is an enlarged horizontal elevation of a fragment of the press showing the bale in the act of being discharged.

Referring particularly to the accompanying drawings, 10 represents the baling or compressing chamber of the press, and 11 the open portion through which the bale is discharged. The compressing chamber has the usual hay receiving opening 12 and the packer 13 which forces the hay into the chamber and compresses the same. A compressor plunger 14 is disposed to slide longitudinally in the chamber 11, and compresses the hay from one end. In the baling chamber are arranged the slotted division blocks 15, these blocks receiving the bale bands or wires 16 in the grooves. Mounted on one side of the chamber 11 is a metal plate 17 to which is connected a wire 18 leading to one side of a battery 19 mounted on any convenient point of the press. While I have shown a battery, I wish it understood that a magneto may be used. Mounted adjacent the battery is an electric bell 20 which is connected to the other side of the battery by the wire 21. Mounted adjacent the plate 17 is an angle plate 22, this plate being cut away as indicated at 23 to receive a vertically disposed metallic arm 24. This arm is mounted on a pivot 25 disposed through the plate 22 and the press. Connected to the plate 22 and to the other side of the bell is a wire 26.

In the operation of the device all of the wires around the bale are tied at the side of the baling chamber, except the bottom wire, this wire being tied outside of the chamber and behind the pivoted contact arm 24. When the bale is pushed toward the discharge end of the press, this last wire engages the arm 24 and pulls the same into contact with the plate 17, thus completing the circuit through the battery and bell and sounding an alarm which is intended as a signal that another division block is to be placed in the baling chamber. The bale wire is then cut, the finished bale allowed to be discharged from the press, and the baling wires for the next bale properly adjusted in the grooves of the blocks. Connected at its opposite ends to the arms 24 and to the side of the press is a spring 27 which holds the arm normally out of contact with the plate 17.

It will thus be seen that I have provided a simple and cheap alarm attachment for a baling press, and one which can be quickly and easily attached to any ordinary press.

What is claimed is:—

1. An automatic alarm for a baling press comprising an audible signal, an electric circuit including said signal, and a circuit closer operable by one of the bale wires for closing a circuit and sounding an alarm.

2. An automatic alarm for a baling press comprising an audible signal, an electric circuit including said signal, an electric contact mounted on one side of the press, and a pivoted contact arm mounted adjacent the plate, said arm and plate being included in the electric circuit and said arm being arranged to be engaged by one of the bale wires to be moved into engagement with the contact plate.

In testimony whereof, I affix my signature, in the presence of two witnesses.

CHARLES R. WARMAN.

Witnesses:
 ROBERT WARMAN,
 J. W. SHAW.

Copies of this patent may be obtained for five cents each, by addressing the "Commissioner of Patents, Washington, D. C."